(12) United States Patent
Meyer et al.

(10) Patent No.: US 10,272,654 B2
(45) Date of Patent: Apr. 30, 2019

(54) POLYCARBONATE COMPOSITION HAVING IMPROVED FLAME RESISTANCE FOR EXTRUSION APPLICATIONS

(75) Inventors: Alexander Meyer, Düsseldorf (DE); Berit Krauter, Opladen (DE); Claus Rüdiger, Krefeld (DE); Ulrich Blaschke, Krefeld (DE); Peter Schwarz, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 330 days.

(21) Appl. No.: 13/505,590

(22) PCT Filed: Nov. 3, 2010

(86) PCT No.: PCT/EP2010/066736
§ 371 (c)(1),
(2), (4) Date: Jun. 4, 2012

(87) PCT Pub. No.: WO2011/054866
PCT Pub. Date: May 12, 2011

(65) Prior Publication Data
US 2012/0244359 A1    Sep. 27, 2012

(30) Foreign Application Priority Data
Nov. 5, 2009   (DE) .................. 10 2009 052 042

(51) Int. Cl.
*C08L 69/00*   (2006.01)
*B32B 27/06*   (2006.01)
(Continued)

(52) U.S. Cl.
CPC .............. *B32B 27/18* (2013.01); *B32B 27/36* (2013.01); *C08L 69/00* (2013.01); *E04C 2/543* (2013.01);
(Continued)

(58) Field of Classification Search
USPC ...................... 428/412; 524/127; 264/173.16
See application file for complete search history.

(56) References Cited

U.S. PATENT DOCUMENTS

| | | | |
|---|---|---|---|
| 2,534,028 A | 12/1950 | Izard | |
| 2,578,660 A | 12/1951 | Auspos et al. | |

(Continued)

FOREIGN PATENT DOCUMENTS

| | | | |
|---|---|---|---|
| CA | 1061926 A1 | 9/1979 | |
| CA | 1238164 A1 | 6/1988 | |

(Continued)

OTHER PUBLICATIONS

International Search Report for PCT/EP2010/066736 dated Mar. 24, 2011.

*Primary Examiner* — Tahseen Khan
(74) *Attorney, Agent, or Firm* — Drinker Biddle & Reath LLP (57) ABSTRACT

The present invention relates to compositions containing flame retardant polycarbonate, which are suitable for producing flame-resistant milk-white colored plates. The composition contains polycarbonate, 0.10 to 4.00 weight percent of an acrylate-based scattering additive, 0.50 to 5.00 weight percent of an aromatic-aliphatic polyester, and 0.50 to 8.00 weight percent of a phosphorus-based flame retardant.

19 Claims, 2 Drawing Sheets

Dimensions in mm

Selected example of an ideal multi-wall sheet profile (51) Int. Cl.
  *B32B 27/18* (2006.01)
  *B32B 27/36* (2006.01)
  *E04C 2/54* (2006.01)
  *C08K 5/523* (2006.01)
  *C08L 51/00* (2006.01)
  *C08L 51/04* (2006.01)
  *C08L 67/02* (2006.01)

(52) U.S. Cl.
  CPC ........ *C08K 5/523* (2013.01); *C08K 2201/014* (2013.01); *C08L 51/003* (2013.01); *C08L 51/04* (2013.01); *C08L 67/02* (2013.01); *Y10T 428/31507* (2015.04)

(56) References Cited

U.S. PATENT DOCUMENTS

| | | | |
|---|---|---|---|
| 2,643,989 | A | 6/1953 | Auspos et al. |
| 2,647,885 | A | 8/1953 | Billica |
| 2,742,494 | A | 4/1956 | Mraz |
| 2,901,466 | A | 8/1959 | Kibler et al. |
| 3,218,372 | A | 11/1965 | Okamura et al. |
| 3,730,767 | A | 5/1973 | Akashi et al. |
| 3,849,188 | A | 11/1974 | Suzuki et al. |
| 3,956,229 | A | 5/1976 | Bollen et al. |
| 3,975,355 | A | 8/1976 | Bollen et al. |
| 4,155,898 | A | 5/1979 | Bopp et al. |
| 4,157,997 | A | 6/1979 | DeMejo et al. |
| 4,281,088 | A | 7/1981 | Kinson |
| 5,340,905 | A | 8/1994 | Kuhling et al. |
| 5,449,710 | A * | 9/1995 | Umeda ............... C08L 69/00 524/165 |
| 6,255,483 | B1 | 7/2001 | Fletcher et al. |
| 2003/0069338 | A1 | 4/2003 | Goossens et al. |
| 2003/0117730 | A1 * | 6/2003 | Kroedel ............... C04B 35/524 359/848 |
| 2005/0075466 | A1 * | 4/2005 | Oguro et al. ............... 525/439 |
| 2006/0234061 | A1 | 10/2006 | Buckel et al. |
| 2007/0054983 | A1 * | 3/2007 | Pudleiner et al. ........... 523/201 |
| 2009/0118406 | A1 * | 5/2009 | Tomoda ..................... 524/284 |
| 2009/0239988 | A1 * | 9/2009 | Jiang ..................... C08L 69/00 524/420 |
| 2010/0330362 | A1 * | 12/2010 | Matsumoto et al. ......... 428/337 |
| 2011/0019390 | A1 * | 1/2011 | Hamasaki ......... B29D 11/00605 362/97.1 |

FOREIGN PATENT DOCUMENTS

| | | | |
|---|---|---|---|
| CN | 101423655 A | | 5/2009 |
| DE | 10 31 512 B | | 6/1958 |
| DE | 1 694 124 A1 | | 7/1971 |
| DE | 2 439 342 A1 | | 2/1976 |
| DE | 26 47 565 A1 | | 4/1977 |
| DE | 2 708 381 A1 | | 9/1977 |
| DE | 30 23 796 A1 | | 1/1981 |
| DE | 4 238 123 A1 | | 5/1994 |
| EP | 0120394 A1 | | 10/1984 |
| EP | 0363608 A1 | | 4/1990 |
| EP | 0634445 A1 | | 1/1995 |
| EP | 0 640 655 A2 | | 3/1995 |
| EP | 1308084 A1 | | 5/2003 |
| GB | 1459954 A | | 12/1976 |
| GB | 1568625 A | | 6/1980 |
| GB | 2317174 A | | 3/1998 |
| JP | 2007217567 A | | 8/2007 |
| WO | WO-99/55772 A1 | | 11/1999 |
| WO | WO-2002059207 A2 | | 8/2002 |
| WO | WO 2006123833 A1 * | | 11/2006 |
| WO | WO 2009102071 A1 * | | 8/2009 |

* cited by examiner

Fig. 1. Ideal profile of a three-wall sheet

Dimensions in mm

Fig. 2: Selected example of an ideal multi-wall sheet profile

Fig.3: Measured multi-wall sheet profile

POLYCARBONATE COMPOSITION HAVING IMPROVED FLAME RESISTANCE FOR EXTRUSION APPLICATIONS

CROSS-REFERENCE TO RELATED APPLICATIONS

This application is a national stage application (under 35 U.S.C. § 371) of PCT/EP2010/066736, filed Nov. 3, 2010, which claims benefit of German application 10 2009 052042.2, filed Nov. 5, 2009, both of which are incorporated herein by reference in their entirety for all their useful purposes.

BACKGROUND

The present invention relates to compositions containing polycarbonate and 0.10 wt. % to 4.00 wt. % of an acrylate-based scattering additive, 0.50 wt. %-5.00 wt. % of an aromatic polyester and 0.50 wt. % to 8.00 wt. % of a phosphorus-based flame retardant, based in each case on the weight of the overall composition, for extrusion applications.

Flameproofed plastics moulding compositions are used for a large number of applications. Typical areas of application for these plastics are electrical engineering and electronics, where they are used inter alia to produce supports for current-carrying parts or in the form of television and monitor housings. However, flameproofed plastics have also become firmly established in the sector of interior claddings in rail vehicles or aircraft. Here, in addition to good flame retardant properties, the plastics used must also display other positive properties to a high level. These include inter alia mechanical properties, such as e.g. high impact strength and adequate long-term stability towards thermal stress or towards possible damage by the action of light. This combination of properties is not always easy to achieve. It is true that the desired flame resistance can generally be established in plastics with the aid of flame retardants. Often, however, relatively large quantities are needed for this purpose, which rapidly leads to a drastic deterioration in other properties, such as e.g. mechanical properties.

Light-scattering properties of plastic can be adjusted by adding so-called scattering additives. However, the addition of organic scattering additives, particularly those based on acrylate, drastically impairs the fire properties of the composition, and large quantities of a flame retardant would have to be added to establish the required flame resistance.

It has now been found that the flame resistance of polycarbonate compositions containing scattering additives can surprisingly be increased significantly by a combined addition of small proportions of polyester and flame retardant additive.

WO 2002/059207 A describes flame retardant polycarbonate compositions containing cycloaliphatic polyesters. However, these cycloaliphatic polyesters have a high aliphatic proportion, which has an unfavourable effect on the fire properties of polycarbonate. Furthermore, they are more expensive compared with aromatic polyesters from the present invention. Mixtures with cycloaliphatic polyesters are not provided by the present invention.

In this connection, US-A 2003/0069338 discloses flame retardant moulding compositions that contain synergistic combinations of cyanoacrylates and flame retardants. The moulding compositions treated in this way are distinguished by improved flame resistance and improved weathering stability. Cyanoacrylates can, however, have an unfavourable effect on the processing behaviour of polycarbonate, e.g. at high temperatures. Mixtures with cyanoacrylates are not provided by the present application.

Mixtures that contain polyalkylene terephthalates and polycarbonates, and uses thereof, are known (cf. e.g. U.S. Pat. No. 3,218,372, DE-OS 1 694 124, U.S. Pat. No. 3,730,767, JP-A 7 401 639, U.S. Pat. No. 3,849,188, DE-OS 2 439 342 and DE-OS 2 708 381). The compositions according to the invention are not described therein, however.

Films and sheets based on polyester-polycarbonate mixtures which consist of no more than 50 wt. % polycarbonate and of at least 50 wt. % polyethylene terephthalate, and may optionally also contain other additives, are also known (cf. U.S. Pat. Nos. 3,956,229, 3,975,355 and DE-OS 26 47 565). The flame resistance of these mixtures is not discussed in these literature references.

Flameproof mixtures of polyalkylene terephthalates, organopolysiloxane-polycarbonate block copolymers and halogenated copolycarbonates, which are suitable for the production of films and sheets, are known (cf. U.S. Pat. No. 4,155,898). Mixtures of polyalkylene terephthalates, organopolysiloxane-polycarbonate block copolymers and $CaCO_3$, which are likewise suitable for the production of films and sheets, are also known (cf. U.S. Pat. No. 4,157,997). Mixtures of specific halogen bisphenol polycarbonates and polyesters such as polybutylene terephthalates that have improved flame retardant properties are also known (cf. DE-OS 30 23 796).

EP-A 0 120 394 describes polycarbonate compositions with aromatic polyesters having improved flame resistance after outdoor weathering. This application does not, however, relate to compositions which contain scattering particles.

The sheets according to the invention are preferably of a multi-layer construction. Thus, they are preferably provided with a UV-protective layer, which is preferably applied in a coextrusion process. Extrusion materials of this type are described in the literature.

US-A 2006/0234061 describes multi-layer systems comprising a UV protective layer which contains polyalkylene (meth)acrylate and compounds of the type of the 2,4-bis(4-phenylphenyl)-6-(2-hydroxyphenyl)-1,3,5-triazines and a second, polycarbonate-containing layer. However, no improvement in the flame retardant properties can be achieved with these systems.

In U.S. Pat. No. 6,255,483 and in GB 2317174 A, biphenyl-substituted triazine compounds are described. Mixtures with other additives are mentioned in general terms. However, no specific teaching on the provision of compositions with improved flame retardant properties can be taken from the document.

It is an object of the present invention to provide compositions containing polycarbonate, which have improved flame retardant properties in combination with a high scattering effect. The compositions should be suitable for milky white coloured extruded products.

BRIEF DESCRIPTION OF EMBODIMENTS

In the context of the present invention, it has now surprisingly been found that the flame resistance of extruded parts made of compositions containing polycarbonate and flame retardants can be increased synergistically by the addition of aromatic polyester and an acrylate-based scattering additive.

The present invention thus relates to compositions containing linear and/or branched aromatic polycarbonate and a) 0.10 wt. %-4.00 wt. %, preferably 0.50 wt. %-2.00 wt. %, particularly preferably 0.50 wt. %-1.50 wt. % and in a special embodiment preferably 1.60 wt. %-4.00 wt. %, of an acrylate-based scattering additive preferably based on polymethyl methacrylate and polybutyl acrylate, e.g. in core-shell morphology;

b) 0.50 wt. %-5.00 wt. %, preferably 1.00 wt. %-3.00 wt. %, particularly preferably 1.00 wt. %-2.50 wt. %, of one or more aromatic-aliphatic polyesters. The polyesters are preferably thermoplastic polyesters, of which the acid component is predominantly aromatic and consists of at least 85 mole % terephthalic acid and the diol component is predominantly aliphatic and consists of at least 80 mole % 1,4-butanediol, 1,2-ethanediol and/or 1,4-cyclohexanedimethanol;

c) 0.50 wt. % to 8.00 wt. %, preferably 1.00 wt. %-6.00 wt. %, particularly preferably 3.00 wt. %-5.50 wt. %, of one or more phosphorus-based flame retardants. Preferably at least one of these phosphorus-based flame retardants is an oligomeric phosphoric acid ester which is derived from bisphenol A or resorcinol, particularly preferably from bisphenol A.

The wt. % data here always relate to the weight of the overall composition.

These compositions can be used advantageously in various applications. The compositions according to the invention are especially suitable for use in the form of sheets for architectural or industrial glazing, such as e.g. wall and roof claddings, skylights or break-resistant glazing, and as claddings for rail vehicle and aircraft interiors, which are all subject to more stringent requirements in terms of flame resistance. These sheets can be produced in particular by extrusion. They can be solid sheets, preferably in a thickness of 1 to 10 mm, or cellular sheets, such as e.g. twin wall sheets or multi wall sheets or hollow profiles with special geometry.

BRIEF DESCRIPTION OF THE DRAWINGS

The foregoing brief description, as well as the following detailed description, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown. In the drawings.

DETAILED DESCRIPTION OF EMBODIMENTS

In the present application, the extruded sheet is also referred to as the "base layer" and the composition used to produce it as the "base material". The base layer may optionally also be provided with other (protective) layers and in particular, on one or both sides, with one or more covering layers. These layers are preferably produced by coextrusion ("coex layers").

Mouldings made of bisphenol A polycarbonate are usually flame resistant and can often achieve the classification V2 according to Underwriters Laboratories Subject 94 even without any special flame-retardant additives. With flame-retardant additives, halogen additives or anti-drip agents, it may even be possible to achieve the classification V0 according to UL Subject 94.

Particularly for extruded articles for use in the building sector, however, further tests are required.

The standard DIN 4102, which is mandatory for the Federal Republic of Germany, divides building materials into the following classes according to their fire behaviour: building material class A non-combustible, building material class B1 low flammability, building material class B2 normal flammability, building material class B3 high flammability. Combustible building materials are categorised as class B1 if they pass the fire shaft test according to DIN 4102.

Thin solid sheets up to 4 mm thickness for interior applications or thin multi-wall sheets and profiles up to a thickness of 10 to 16 mm made of bisphenol A polycarbonate can achieve a B1 in the fire shaft test. For thick solids sheets with a thickness greater than 4 mm or thicker multi-wall sheets and profiles with thicknesses greater than 16 mm, often only a B2 can be achieved for outdoor applications, particularly if the multi-wall sheets have complicated profiles and/or a high weight per unit area and are additionally coloured with organic additives.

Using the compositions described here, extruded articles can be produced which, even if they have a complicated profile and/or high weights per unit area, surprisingly meet the requirements mentioned above for a B1 classification.

In particular, sheets with weights per unit area of greater than or equal to 2.4 kg/m$^2$, greater than or equal to 2.5 kg/m$^2$ and/or greater than or equal to 2.7 kg/m$^2$ can be produced with the composition according to the invention. Other preferred weights per unit area of the sheets are greater than or equal to 2.8 kg/m$^2$, greater than or equal to 3.1 kg/m$^2$ and/or greater than or equal to 3.4 kg/m$^2$. In other embodiments, preferred sheets are those with a weight per unit area of greater than or equal to 3.5 kg/m$^2$ and/or greater than or equal to 3.7 kg/m$^2$ and sheets with a weight per unit area of greater than or equal to 4.2 kg/m$^2$. Particularly preferred are also sheets with the above-mentioned weights per unit area which are multi-wall sheets.

Figure 1:
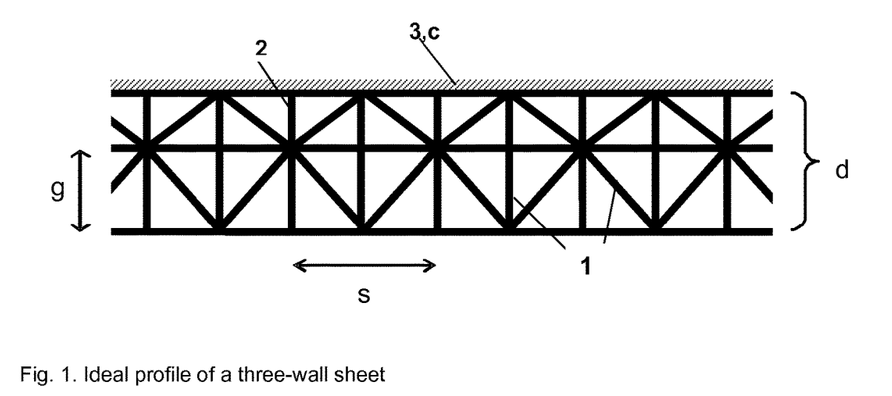
FIG. 1 illustrates an example of a multi-wall sheet further containing a coextrusion layer (3)

An example of a multi-wall sheet (triple-wall sheet with an X profile) additionally containing a coextrusion layer (3) is illustrated in FIG. 1. The multi-wall sheet consists of ribs (1) and walls (2), with the upper and lower walls forming the outer layers in each case. If the ribs are not all parallel to one another perpendicular to the walls, but intersect at an internal wall, the profile is referred to as an X profile. The spacing between two parallel ribs at the outer walls is s, and the spacing between the walls (2) is labelled as g. The total thickness of the sheet from outer wall to outer wall is labelled as d, and the thickness of the coextrusion layer (3) is labelled as c.

From the composition according to the invention, for example sheets with the following sheet geometries are produced:

3-wall sheet with a thickness of 12 to 20 mm and a rib spacing of 12 to 20 mm, 6-wall sheet with a thickness of 12 to 22 mm and a rib spacing of 12 to 22 mm, 3-wall sheet with an X profile and a thickness of 12 to 20 mm wherein the X structure (formed by 3 ribs) has a width of 20 to 30 mm, 5-wall sheet with an X profile and a thickness of 20 to 50 mm wherein the X structure (formed by 3 ribs) has a width of 20 to 30 mm, 5-wall sheet with an M profile and a thickness of 20 to 50 mm, wherein the ribs have a spacing of 15 to 25 mm.

Figure 2:
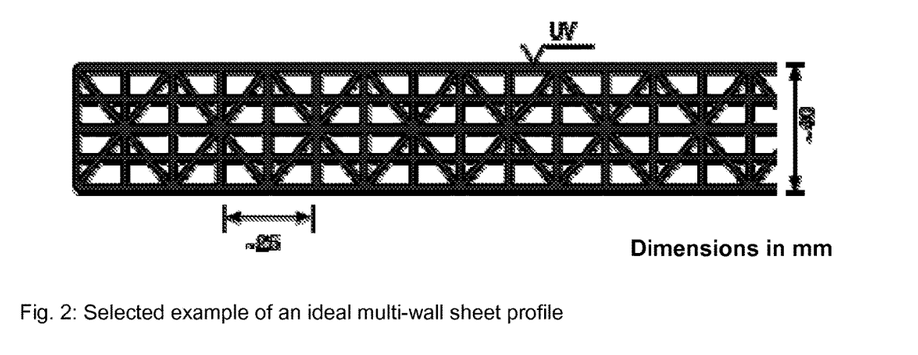
FIG. 2 illustrates a 5-wall sheet with an X profile according to an embodiment of the present invention.

Another exemplary embodiment is illustrated in FIG. 2, which shows an ideal 5-wall sheet with an X profile.

The present invention also relates to processes for the production of a composition according to the invention, characterised in that polycarbonate and a) 0.10 wt. %-4.00 wt. % of an acrylate-based scattering additive b) 0.50 wt. %-5.00 wt. % of an aromatic/aliphatic polyester c) 0.50 wt. % to 8.00 wt. % of a phosphorus-based flame retardant are brought together and blended, optionally in solvent, with optional homogenisation and removal of the solvent. Individual additives may optionally be premixed with a powdered or granular polycarbonate and then added.

Polycarbonates for the compositions according to the invention are homopolycarbonates, copolycarbonates, thermoplastic polyester carbonates and blends or mixtures of these polymers. Particularly preferred is aromatic linear and/or branched aromatic polycarbonate, and most particularly preferred for certain embodiments of the present invention are mixtures of branched and linear polycarbonate.

It is preferred here to use mixtures that contain at least 50 wt. %, preferably at least 60 wt. %, particularly preferably at least 70 wt. %, linear polycarbonate and at least 10 wt. %, preferably at least 14 wt. %, branched polycarbonate.

The compositions according to the invention preferably consist of at least 80 wt. % polycarbonate based on bisphenol A (sum of branched and linear bisphenol A polycarbonate). All wt. % data again relate here to the weight of the overall composition in each case.

The linear or branched polycarbonates and copolycarbonates according to the invention generally have average molecular weights (weight average) of 2,000 to 200,000, preferably 3,000 to 150,000, in particular 5,000 to 100,000, most particularly preferably 8,000 to 80,000, in particular 12,000 to 70,000 g/mol (determined by gel permeation chromatography with polycarbonate calibration).

For the present invention, polycarbonates with a weight average molecular weight $\overline{M}_W$ of 16,000 to 40,000 g/mol are particularly preferred.

Regarding the production of polycarbonates for the compositions according to the invention, reference is made by way of example to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), to D. Freitag, U. Grigo, P. R. Müllner, N. Nouvertne, BAYER AG, "Polycarbonates" in Encyclopedia of Polymer Science and Engineering, Vol. 11, Second Edition, 1988, pages 648-718 and finally to Drs. U. Grigo, K. Kircher and P. R. Müller "Polycarbonate" in Becker/Braun, Kunststoff-Handbuch, vol. 3/1, Polycarbonate, Polyacetale, Polyester, Celluloseester, Carl Hanser Verlag Munich, Vienna 1992, pages 117-299. The production preferably takes place by the interfacial polycondensation process or the melt transesterification process and is described first using the interfacial polycondensation process as an example.

Compounds preferably to be used as starting compounds are bisphenols of the general formula HO—Z—OH, wherein Z is a divalent organic residue with 6 to 30 carbon atoms which contains one or more aromatic groups. Examples of these compounds are bisphenols which belong to the group of the dihydroxydiphenyls, bis(hydroxyphenyl) alkanes, indane bisphenols, bis(hydroxyphenyl) ethers, bis(hydroxyphenyl) sulfones, bis(hydroxyphenyl) ketones and α,α'-bis(hydroxyphenyl) diisopropylbenzenes.

Particularly preferred bisphenols belonging to the above groups of compounds are bisphenol A, tetraalkyl bisphenol A, 4,4-(metaphenylene diisopropyl) diphenol (bisphenol M), 4,4-(paraphenylene diisopropyl) diphenol, N-phenylisatin bisphenol, 1,1-bis(4-hydroxyphenyl)-3,3,5-trimethylcyclohexane (BP-TMC), bisphenols of the type of the 2-hydrocarbyl-3,3-bis(4-hydroxyaryl) phthalimidines, in particular 2-phenyl-3,3-bis(4-hydroxyphenyl) phthalimidine, and optionally mixtures thereof Particularly preferred are homopolycarbonates based on bisphenol A and copolycarbonates based on the monomers bisphenol A and 1,1-bis(4-hydroxyphenyl)-3,3,5-trimethylcyclohexane. The bisphenol compounds to be used according to the invention are reacted with carbonic acid compounds, in particular phosgene, or in the melt transesterification process diphenyl carbonate or dimethyl carbonate.

Polyester carbonates are obtained by reacting the already mentioned bisphenols, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenone dicarboxylic acids. A part, up to 80 mole % and preferably from 20 to 50 mole %, of the carbonate groups in the polycarbonates can be replaced by aromatic dicarboxylic acid ester groups.

Inert organic solvents used in the interfacial polycondensation process are, for example, dichloromethane, the various dichloroethanes and chloropropane compounds, tetrachloromethane, trichloromethane, chlorobenzene and chlorotoluene. Chlorobenzene or dichloromethane, or mixtures of dichloromethane and chlorobenzene, are preferably used.

The interfacial polycondensation reaction can be accelerated by catalysts such as tertiary amines, in particular N-alkylpiperidines or onium salts. Tributylamine, triethylamine and N-ethylpiperidine are preferably used. In the case of the melt transesterification process, the catalysts mentioned in DE-A 42 38 123 are used.

The polycarbonates can be branched in a deliberate and controlled manner by using small quantities of branching agents. Some suitable branching agents are: isatinbiscresol, phloroglucinol, 4,6-dimethyl-2,4,6-tri(4-hydroxyphenyl)-heptene-2; 4,6-dimethyl-2,4,6-tri(4-hydroxyphenyl)-heptane; 1,3,5-tri(4-hydroxyphenyl)benzene; 1,1,1-tri(4-hydroxyphenyl)ethane; tri(4-hydroxy-phenyl)phenylmethane; 2,2-bis[4,4-bis(4-hydroxyphenyl)cyclohexyl]propane; 2,4-bis(4-hydroxy-phenylisopropyl)phenol; 2,6-bis(2-hydroxy-5'-methylbenzyl)-4-methylphenol; 2-(4-hydroxy-phenyl)-2-(2,4-dihydroxyphenyl)propane; hexa(4-(4-hydroxyphenylisopropyl)phenyl) ortho-terephthalate; tetra (4-hydroxyphenyl)methane; tetra(4-(4-hydroxyphenylisopropyl)phenoxy)-methane; α,α',α"-tris(4-hydroxyphenyl)-1,3,5 -triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and in particular: 1,1,1-tri(4-hydroxyphenyl)ethane and bis(3-methyl-4-hydroxyphenyl)-2-oxo-2,3-dihydroindole.

The 0.05 to 2 mole %, based on diphenols used, of branching agents or mixtures of branching agents that can optionally be incorporated, can be used together with the diphenols but are also added at a later stage of the synthesis.

Chain terminators can be used. As chain terminators it is preferable to use phenols such as phenol, alkylphenols such as cresol and 4-tert.-butylphenol, chlorophenol, bromophenol, cumylphenol or mixtures thereof in quantities of 1-20 mole %, preferably 2-10 mole %, per mole of bisphenol. Phenol, 4-tert.-butylphenol and cumylphenol are preferred.

Chain terminators and branching agents can be added to the syntheses separately or else together with the bisphenol.

The particularly preferred polycarbonate according to the invention is bisphenol A homopolycarbonate.

Alternatively, the polycarbonates according to the invention can also be produced by the melt transesterification process. The melt transesterification process is described, for example, in the Encyclopedia of Polymer Science, Vol. 10 (1969), Chemistry and Physics of Polycarbonates, Polymer Reviews, H. Schnell, Vol. 9, John Wiley and Sons, Inc. (1964) and in DE-C 10 31 512.

In the melt transesterification process, the aromatic dihydroxy compounds already described for the interfacial polycondensation process are transesterified in the melt with carbonic acid diesters with the aid of suitable catalysts and optionally other additives.

Carbonic acid diesters within the meaning of the invention are those of formulae (1) and (2)

Formula (1)

Formula (2)

wherein
R, R' and R", independently of one another, can represent H, optionally branched $C_1$-$C_{34}$ alkyl/cycloalkyl, $C_7$-$C_{34}$ alkaryl or $C_6$-$C_{34}$ aryl,
for example,
diphenyl carbonate, butylphenyl phenyl carbonate, dibutylphenyl carbonate, isobutylphenyl phenyl carbonate, diisobutylphenyl carbonate, tert-butylphenyl phenyl carbonate, di-tert-butylphenyl carbonate, n-pentylphenyl phenyl carbonate, di(n-pentylphenyl) carbonate, n-hexylphenyl phenyl carbonate, di(n-hexylphenyl) carbonate, cyclohexylphenyl phenyl carbonate, dicyclohexylphenyl carbonate, phenylphenol phenyl carbonate, diphenylphenol carbonate, isooctylphenyl phenyl carbonate, diisooctylphenyl carbonate, n-nonylphenyl phenyl carbonate, di(n-nonylphenyl) carbonate, cumylphenyl phenyl carbonate, dicumylphenyl carbonate, naphthylphenyl phenyl carbonate, dinaphthylphenyl carbonate, di-tert.-butylphenyl phenyl carbonate, di-(di-tert.-butylphenyl) carbonate, dicumylphenyl phenyl carbonate, di-(dicumylphenyl) carbonate, 4-phenoxyphenyl phenyl carbonate, di-(4-phenoxyphenyl) carbonate, 3-pentadecylphenyl phenyl carbonate, di-(3-pentadecylphenyl) carbonate, tritylphenyl phenyl carbonate, ditritylphenyl carbonate, preferably
diphenyl carbonate, tert-butylphenyl phenyl carbonate, di-tert.-butylphenyl carbonate, phenylphenol phenyl carbonate, diphenylphenol carbonate, cumylphenyl phenyl carbonate, dicumylphenyl carbonate,
particularly preferably diphenyl carbonate.

Mixtures of the above carbonic acid diesters can also be used.

The content of carbonic acid esters is 100 to 130 mole %, preferably 103 to 120 mole %, particularly preferably 103 to 109 mole %, based on the dihydroxy compound.

As catalysts within the meaning of the invention, basic catalysts as described in the above-mentioned literature, such as for example alkali and alkaline earth hydroxides and oxides, but also ammonium or phosphonium salts, referred to below as onium salts, are used in the melt transesterification process. Onium salts, particularly preferably phosphonium salts, are preferably used in this case. Phosphonium salts within the meaning of the invention are those of formula (3)

Formula (3)

wherein
$R^{1-4}$ can be the same or different $C_1$-$C_{10}$ alkyls, $C_6$-$C_{10}$ aryls, $C_7$-$C_{10}$ aralkyls or $C_5$-$C_6$ cycloalkyls, preferably methyl or $C_6$-$C_{14}$ aryls, particularly preferably methyl or phenyl, and
$X^-$ can be an anion, such as hydroxide, sulfate, hydrogen sulfate, hydrogen carbonate, carbonate, a halide, preferably chloride, or an alcoholate of the formula OR, wherein R can be $C_6$-$C_{14}$ aryl or $C_7$-$C_{12}$ aralkyl, preferably phenyl.

Preferred catalysts are
tetraphenylphosphonium chloride,
tetraphenylphosphonium hydroxide,
tetraphenylphosphonium phenolate,
particularly preferably tetraphenylphosphonium phenolate.

The catalysts are used preferably in quantities of $10^{-8}$ to $10^{-3}$ mol, based on one mol of bisphenol, particularly preferably in quantities of $10^{-7}$ to $10^{-4}$ mol.

Other catalysts can be used alone or optionally in addition to the onium salt in order to increase the rate of polymerisation. These include salts of alkali metals and alkaline earth metals, such as hydroxides, alkoxides and aryl oxides of lithium, sodium and potassium, preferably hydroxide, alkoxide or aryl oxide salts of sodium. Most preferred are sodium hydroxide and sodium phenolate. The quantities of the cocatalyst can be in the range of 1 to 200 ppb, preferably 5 to 150 ppb and most preferably 10 to 125 ppb, calculated as sodium in each case.

The transesterification reaction of the aromatic dihydroxy compound and the carbonic acid diester in the melt is preferably performed in two steps. In the first step, the melting of the aromatic dihydroxy compound and the carbonic acid diester takes place at temperatures of 80 to 250° C., preferably 100 to 230° C., particularly preferably 120 to 190° C., under standard pressure in 0 to 5 hours, preferably 0.25 to 3 hours. After the addition of the catalyst, the oligocarbonate is produced from the aromatic dihydroxy compound and the carbonic acid diester by distilling off the monophenol by applying a vacuum (up to 2 mm Hg) and increasing the temperature (up to 260° C.).

The majority of the vapours from the process are formed here. The oligocarbonate thus produced has a weight average molecular weight $M_W$ (determined by measuring the relative solution viscosity in dichloromethane or in mixtures of equal quantities by weight of phenol/o-dichloro-benzene calibrated by light scattering) in the range of 2000 g/mol to 18 000 g/mol and preferably from 4 000 g/mol to 15 000 g/mol.

In the second step, during polycondensation, the polycarbonate is produced by further increasing the temperature to 250 to 320° C., preferably 270 to 295° C. and a pressure of <2 mm Hg. In this step, the remainder of vapours are removed from the process.

The catalysts can also be used in combination (two or more) with one another.

When alkali/alkaline earth metal catalysts are used, it may be advantageous to add the alkali/alkaline earth metal catalysts at a later point in time (e.g. after the oligocarbonate synthesis during the polycondensation in the second step).

The reaction of the aromatic dihydroxy compound and the carbonic acid diester to form the polycarbonate can be performed batchwise, or preferably continuously, within the meaning of the process according to the invention, for example in stirred vessels, thin layer evaporators, falling film evaporators, stirred vessel cascades, extruders, kneaders, simple disc reactors and high-viscosity disc reactors.

As in the interfacial polycondensation process, branched poly- or copolycarbonates can be produced by using polyfunctional compounds.

For the acrylate-based scattering additives contained in the composition according to the invention, polymethyl methacrylate-containing additives are preferably used, e.g. polymeric particles of polymethyl methacrylate and polybutyl acrylate with core-shell morphology, such as e.g. Paraloid® EXL 5136 or Paraloid® EXL 5137 obtainable from Rohm & Haas, or partially or fully crosslinked spherical or non-spherical acrylate particles, such as e.g. those from the Techpolymer® MBX series from Sekisui Plastics.

Scattering additives with core-shell morphology are described, for example, in EP 0 634 445 B1 as "polymeric particle (b)".

The scattering additives generally have an average particle diameter of at least 0.5 micrometres, preferably of at least 2 micrometres, more preferably of 2 to 50 micrometres, most preferably of 2 to 15 micrometres. The average here is understood as the number average of the particle diameters and the particle diameter as the diameter of a sphere with a volume equivalent to the particle. Preferably, at least 90% have a diameter of more than 2 micrometres. The scattering additives are used, for example, as a free-flowing powder or in compacted form.

The aromatic polyesters also used in the composition according to the invention are preferably aromatic/aliphatic thermoplastic polyesters, of which the acid component consists of at least 85 mole % terephthalic acid and the diol component of at least 80 mole % 1,4-butanediol, 1,2-ethanediol and/or 1,4-cyclohexanedimethanol. These are e.g. polyesters with butylene terephthalate, ethylene terephthalate, and/or cyclohexanedimethanol terephthalate units. The diol component can consist of up to 20 mole % of other aliphatic diols with 3 to 12 C atoms or cycloaliphatic diols with 6 to 21 C atoms. 1,3-Propanediol, neopentyl glycol, 1,5-pentanediol, 1,6-hexanediol, 3-methyl-2,4-pentanediol, 2-methyl-2,4-pentanediol and 2,2,4-trimethyl-1,3-pentanediol are examples here.

In addition to terephthalic acid, up to 15 mole % dicarboxylic acids, e.g. isophthalic acid, adipic acid, succinic acid, sebacic acid, 2,6-naphthalenedicarboxylic acid, diphenyldicarboxylic acid, azelaic acid and cyclohexanediacetic acid can be contained in the acid component.

The polyalkylene glycol terephthalates can be obtained by known methods, for example from terephthalic acid dialkyl esters and the corresponding diol by transesterification (production methods cf. e.g. U.S. Pat. Nos. 2,647,885, 2,643, 989, 2,534,028, 2,578,660, 2,742,494, 2,901,466). The production starts, for example, from a low alkyl ester of terephthalic acid, preferably the dimethyl ester, which is esterified with an excess of diol in the presence of suitable catalysts to form the bishydroxyalkyl ester of terephthalic acid. During this process the temperature is increased, starting from 140° C., up to 210-220° C. The alcohol that is released is distilled off. The condensation then takes place at temperatures of 210-280° C., during which the pressure is reduced gradually to less than 1 Torr, with excess diol being distilled off.

The weight-average molecular weights $\overline{M}_W$ of the terephthalates or of the mixed polyesters of terephthalic and isophthalic acids are between 30 000 and 80 000, determined by measuring the intrinsic viscosity (limiting viscosity number, value of the reduced specific viscosity extrapolated to 0 concentration)—I.V.—in phenol/o-dichlorobenzene (1/1) at 25° C. as a 5% solution or by means of the RSV value (reduced specific viscosity), which is the value of the specific viscosity divided by the concentration of the measured solution. The RSV value is determined in phenol/tetrachloroethane (60/40) at 20° C. with a 23% solution.

Particularly preferred aromatic/aliphatic thermoplastic polyesters are polybutylene terephthalates with a $\overline{M}_W$ between 30 000 and 60 000.

The phosphorus-based flame retardants contained in the composition according to the invention preferably consist of oligomeric phosphoric acid esters, which are derived from the following formula (4):

wherein
$R^1$, $R^2$, $R^3$ and $R^4$, independently of one another, signify optionally halogen-substituted $C_1$-$C_8$ alkyl or, each optionally halogen- and/or alkyl-substituted, $C_5$-$C_6$ cycloalkyl, $C_6$-$C_{10}$ aryl or $C_7$-$C_{12}$ aralkyl,
n independently of one another signifies 0 or 1,
q independently of one another signifies 0, 1, 2, 3 or 4,
N is 0.60 to 4.00, preferably 0.90 to 2.50, in particular 1.00 to 1.15,
$R^5$ and $R^6$, independently of one another, signify $C_1$-$C_4$ alkyl, preferably methyl, or halogen, preferably chlorine and/or bromine,
Y signifies $C_1$-$C_7$ alkylidene, $C_1$-$C_7$ alkylene, $C_5$-$C_{12}$ cycloalkylene, $C_5$-$C_{12}$ cyclo-alkylidene, —O—, —S—, —SO—, —SO$_2$—, —CO— or a residue of formula (5) or (6)

with
Z=carbon and
R²¹ and R²² can be selected for each Z individually and, independently of one another, signify hydrogen or C1-C6 alkyl, preferably hydrogen, methyl or ethyl,
m is an integer from 4 to 7, preferably 4 or 5,
with the proviso that, on at least one Z atom, R²¹ and R²² are simultaneously alkyl.

The phosphorus compounds according to formula (4) that are suitable according to the invention are generally known (cf. for example Ullmanns Encyklopädie der Technischen Chemie, vol. 18, pp. 301 ff. 1979; Houben-Weyl, Methoden der Organischen Chemie, vol. 12/1, p. 43; Beilstein, vol. 6, p. 177).

Preferred substituents $R^1$ to $R^4$ comprise methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ can be substituted with halogen and/or $C_1$-$C_4$ alkyl. Particularly preferred aryl residues are cresyl, phenyl, xylenyl, propyl phenyl or butyl-phenyl as well as the brominated and chlorinated derivatives thereof.

$R^5$ and $R^6$, independently of one another, preferably signify methyl or bromine.

Y preferably denotes $C_1$-$C_7$ alkylene, particularly isopropylidene or methylene, most particularly preferably isopropylidene.

n in formula (4), independently of one another, can be 0 or 1, with n preferably equal to 1.

q can be 0, 1, 2, 3 or 4, with q preferably being 0, 1 or 2.

N can assume values of 0.50 to 4.00, preferably 0.90 to 2.50, in particular 1.00 to 1.15. As flame retardant according to the invention according to formula (4), it is also possible to use mixtures of different phosphates. In this case, N is an average value. Monophosphorus compounds (N=0) can also be contained in this mixture.

The content of the monophosphorus compounds (N=0) in the flame retardant according to formula (4) is preferably less than or equal to 5.00 wt. %, preferably less than or equal to 4.00 wt. %, particularly preferably less than or equal to 3.00 wt. %.

The average N values can be determined by determining the composition of the phosphate mixture (molecular weight distribution) by a suitable method (gas chromatography (GC), high pressure liquid chromatography (HPLC), gel permeation chromatography (GPC)) and calculating the average values for N therefrom.

Within the framework of the present invention, the phosphorus compounds of formula (4) are used in quantities of 0.50 wt. % to 8.00 wt. %.

The above-mentioned phosphorus compounds are known (cf. e.g. EP-A 363 608, EP-A 640 655) or can be produced by known methods in an analogous manner (e.g. Ullmanns Enzyklopädie der technischen Chemie, vol. 18, p. 301 ff. 1979; Houben-Weyl, Methoden der organischen Chemie, vol. 12/1, p 43; Beilstein vol. 6, p 177).

Bisphenol A diphosphate is particularly preferred within the framework of the present invention. Bisphenol A diphosphate is commercially available inter alia as Reofos® BAPP (Chemtura, Indianapolis, USA), NcendX® P-30 (Albemarle, Baton Rouge, La., USA), Fyrolflex® BDP (Akzo Nobel, Arnheim, Netherlands) or CR 741® (Daihachi, Osaka, Japan).

Other phosphoric acid esters that can be used within the framework of the present invention are also triphenyl phosphate, which is sold inter alia as Reofos® TPP (Chemtura), Fyrolflex® TPP (Akzo Nobel) or Disflamoll® TP (Lanxess), as well as resorcinol diphosphate. Resorcinol diphosphate can be obtained commercially as Reofos® RDP (Chemtura) or Fyrolflex® RDP (Akzo Nobel).

Other aromatic polycarbonates and/or other plastics, such as aromatic polyester carbonates, polyamides, polyimides, polyester amides, polyacrylates and polymethacrylates, such as e.g. polyalkyl (meth)acrylates and here in particular polymethyl methacrylate, polyacetals, polyurethanes, polyolefins, halogen-containing polymers, polysulfones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or of alpha-methylstyrene with dienes or acrylic derivatives, graft polymers based on acrylonitrile/butadiene/styrene or graft copolymers based on acrylate rubber (cf. for example the graft polymers described in EP-A 640 655) or silicone rubbers can also be mixed into the polycarbonates and copolycarbonates according to the invention in a known manner, for example by compounding.

The conventional additives for these thermoplastics, such as fillers, UV stabilisers, heat stabilisers, antistatic agents and pigments, can also be added in the conventional quantities to the polycarbonates according to the invention and the other plastics that are optionally contained; the mould release properties and the flow properties can also optionally be improved by adding external mould release agents and free-flow agents (e.g. low-molecular-weight carboxylic acid esters, chalk, silica flour, glass and carbon fibres, pigments and combinations thereof). Additives conventionally used for polycarbonate are described e.g. in WO 99/55772 A, pp. 15-25, EP A 1 308 084 and in the appropriate chapters of the "Plastics Additives Handbook", ed. Hans Zweifel, 5$^{th}$ Edition 2000, Hanser Publishers, Munich.

The salts optionally added to further increase the flame resistance of the composition according to the invention are, for example, alkali or alkaline earth salts of aliphatic or aromatic sulfonic acid, sulfonamide and sulfonimide derivatives, e.g. sodium or potassium perfluorobutane sulfate, sodium or potassium perfluoromethane sulfonate, sodium or potassium perfluorooctane sulfate, sodium or potassium 2,5-dichlorobenzene sulfate, sodium or potassium 2,4,5-trichlorobenzene sulfate, sodium or potassium methylphosphonate, sodium or potassium (2-phenylethylene) phosphonate, sodium or potassium pentachlorobenzoate, sodium or potassium 2,4,6-trichlorobenzoate, sodium or potassium 2,4-dichlorobenzoate, lithium phenylphosphonate, sodium or potassium diphenyl sulfone sulfonate, sodium or potassium 2-formyl benzenesulfonate, sodium or potassium (N-benzenesulfonyl) benzenesulfonamide. trisodium or tri- potassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-(p-tolylsulfonyl)-p-toluenesulfimide potassium salt, N-(N'-benzylaminocarbonyl)sulfanylimide potassium salt.

Sodium or potassium perfluorobutane sulfate, sodium or potassium perfluorooctane sulfate, sodium or potassium diphenylsulfone sulfonate and sodium or potassium 2,4,6-trichlorobenzoate and N-(p-tolylsulfonyl)-p-toluenesulfimide potassium salt, N-(N'-benzylaminocarbonyl)sulfanylimide potassium salt are preferred. Potassium nonafluoro-1-butanesulfonate and sodium or potassium diphenylsulfone sulfonate are most particularly preferred. Potassium perfluorobutane sulfonate is commercially available inter alia as Bayowet®C4 (Lanxess, Leverkusen, Germany), RM64® (Miteni, Italy) or as 3M™ Perfluorobutanesulfonyl Fluoride FC-51 (3M, USA). Mixtures of the above salts are also suitable.

In addition, polytetrafluoroethylene (PTFE) can also be added to the moulding compositions as an anti-drip agent. This is commercially available in various product grades. These include additives such as Hostaflon® TF2021 or PTFE blends such as Metablen® A-3800.

Other suitable flame retardants within the meaning of the present invention are halogen-containing compounds. These include brominated compounds, such as brominated oligocarbonates (e.g. tetrabromobisphenol A oligocarbonate BC-52®, BC-58®, BC-52HP® from Chemtura), polypentabromobenzyl acrylate (e.g. FR 1025® from Dead Sea Bromine (DSB)), oligomeric reaction products of tetrabromobisphenol A with epoxides (e.g. FR 2300® and 2400® from DSB), or brominated oligo- or polystyrenes (e.g. Pyro-Chek® 68PB from Ferro Corporation, PDBS 80® and Firemaster® PBS-64HW from Chemtura).

Moreover, chlorine-containing flame retardants, such as e.g. tetrachlorophthalimides, can be used.

(7)

(8)

The following may be mentioned as examples of suitable tetrachlorophthalimides within the meaning of the invention according to formula (7): N-methyltetrachlorophthalimide, N-ethyl-tetrachlorophthalimide, N-propyltetrachlorophthalimide, N-isopropyltetrachlorophthalimide, N-butyltetrachlorophthalimide, N-isobutyltetrachlorophthalimide, N-phenyltetrachlorophthalimide, N-(4-chlorophenyl)tetrachlorophthalimide, N-(3,5-dichlorophenyl)tetrachlorophthalimide N-(2,4,6-trichlorophenyl)tetrachlorophthalimide, N-naphthyltetrachlorophthalimide. As examples of suitable tetrachlorophthalimides within the meaning of the invention according to formula (7), the following may be mentioned: N,N'-ethylene ditetrachlorophthalimide. N,N'-propylene ditetrachlorophthalimide N,N'-butylene ditetrachlorophthalimide N,N'-p-phenylene di-tetrachlorophthalimide, 4,4'-ditetrachlorophthalimidodiphenyl, N-(tetrachlorophthalimido)tetra-chlorophthalimide. Particularly suitable within the meaning of the invention are N-methyl- and N-phenyltetrachlorophthalimide, N,N'-ethylene ditetrachlorophthalimide and N-(tetrachlorophthalimido)tetrachlorophthalimide. Mixtures of various tetrachlorophthalimides of formulae (7) or (8) can likewise be used.

The bromine- or chlorine-containing flame retardants can also be used in combination with antimony trioxide.

The present invention is not limited to the flame retardants mentioned, but other flame-retardant additives, such as those described e.g. in J. Troitzsch, "International Plastics Flammability Handbook", Hanser Verlag, Munich 1990, can also be used.

Within the framework of present invention, the sole use of phosphoric acid esters according to formula (4) as flame retardants is particularly preferred, without the addition of other flame retardants and/or anti-drip agents.

The production of a composition containing polycarbonate and the above-mentioned fillers and additives can take place using common incorporating methods, for example by blending solutions of the fillers and a solution of the polycarbonate in suitable solvents such as dichloromethane, haloalkanes, haloaromatics, chlorobenzene and xylenes. The substance mixtures are then homogenised preferably in a known manner by extrusion. The solution mixtures are preferably processed, for example compounded, in a known manner by evaporation of the solvent and subsequent extrusion.

In addition, the composition can be mixed and then extruded in conventional mixing equipment such as screw extruders (e.g. twin screw extruders, ZSK), kneaders, Brabender or Banbury mills. After the extrusion, the extrudate can be cooled and pelletised. Individual components can also be premixed and then the remaining starting substances added individually or also as a mixture.

After the production and processing of the composition according to the invention, these can be processed into any shaped articles, for example by extrusion, injection moulding or extrusion blow moulding. The compositions are preferably processed into (co)extruded shaped articles, such as e.g. sheets.

As base material for these sheets it is possible to use linear polycarbonate, branched polycarbonate or a mixture of linear and branched polycarbonate.

For solids sheets, linear polycarbonate is preferably but not exclusively used.

For multi-wall sheets, linear polycarbonate, branched polycarbonate or a mixture of linear and branched polycarbonate is used. It is preferred to use mixtures containing at least 50 wt. %, preferably at least 60 wt. %, particularly preferably at least 70 wt. % linear polycarbonate and at least 10 wt. %, preferably at least 14 wt. % branched polycarbonate.

The sheets preferably consist of at least 80 wt. % polycarbonate based on bisphenol A (sum of branched and linear bisphenol A polycarbonate). All wt. % data are again based here on the weight of the overall composition in each case.

The sheets within the meaning of the invention preferably contain at least one covering layer containing UV absorbers. Furthermore, the base layer can also contain UV absorbers. Covering layers can be applied on one or both sides. The thickness of the coextruded covering layers is usually between 5 and 150 µm, preferably between 20 and 100 µm.

The thickness of the covering layer can vary slightly over the width. The polycarbonate of the covering layer can consist of linear and/or branched polycarbonate; linear polycarbonate is preferably used.

In particular, this invention relates to sheets which contain in the covering layer(s) one or more UV absorbers selected from the following classes of substances: benzotriazoles, triazines, cyanoacrylates, bismalonates.

The covering layer most particularly preferably contains one or more UV absorbers selected from the following substances: 2-[2-hydroxy-4-(2-ethylhexyl)oxy]phenyl-4,6-di(4-phenyl)phenyl-1,3,5-triazine (CAS No. 204583-39-1); 2-(2H-benzotriazol-2-yl)-4-(1,1-dimethylethyl)-6-(1-methyl-propyl)phenol (CAS No. 36437-37-3), which is commercially available with the name Tinuvin® 350 from Ciba; 2,2'-methylenebis[6-(2H-benzotriazol-2-yl)-4-(1,1,3,3-tetramethylbutyl)phenol (CAS No. 103597-45-1), which is commercially available with the name Tinuvin® 360 from Ciba or the name ADK Stab LA31® from Adeka-Palmarole; 2-(4,6-diphenyl-1,3,5-triazin-2-yl)-5-(hexyloxy)phenol (CAS No. 147315-50-2), which is commercially available with the name Tinuvin® 1577 from Ciba; 2-[4,6-bis(2,4-dimethylphenyl)-1,3,5-triazin-2-yl]-5-(octyloxy)phenol (CAS No. 2725-22-6), which is commercially available with the name Cyasorb UV 1164 from Cytec Industries Inc.; ethyl-2-cyano-3,3-diphenyl acrylate (CAS No. 5232-99-5), which is commercially available with the name Uvinul® 3035 from BASF AG; 2-ethylhexyl-2-cyano-3,3-diphenyl acrylate (CAS No. 6197-30-4), which is commercially available with the name Uvinul® 3039 from BASF AG; 1,3-bis [(2'-cyano-3',3'-diphenylacryloyl)oxy]-2,2-bis{[(2'-cyano-3',3'-diphenylacryloyl)oxy]methyl}propane (CAS No. 178671-58-4), which is commercially available with the name Uvinul® 3030 from BASF AG; tetraethyl-2,2'-(1,4-phenylenedimethylidene) bismalonate (CAS No. 6337-43-5), which is commercially available with the name Hostavin® B-CAP™ XP3030 from Clariant GmbH.

The base layer of the sheets according to the invention contains either no UV absorber or one or more UV absorbers selected from the following classes of substances: benzotriazoles, cyanoacrylates, bismalonates.

The base layer of the according to the invention preferably contains one or more UV absorbers, particularly preferably selected from the following substances: 2-(2H-benzotriazol-2-yl)-4-(1,1,3,3-tetramethylbutyl)phenol (CAS No. 3147-75-9), which is commercially available with the name Tinuvin® 329 from Ciba or with the name Uvinul® 3029 from BASF AG or with the name Cyasorb® UV 5411 from Cytec Industries Inc.; 2-(2H-benzotriazol-2-yl)-4,6-bis (1-methyl-1-phenylethyl)phenol (CAS No. 70321-86-7), which is commercially available with the name Tinuvin 234® from Ciba; 2-(5-chloro-2H-benzotriazol-2-yl)-6-(1,1-dimethylethyl)-4-methyl)phenol (CAS No. 3896-11-5), which is commercially available with the name Tinuvin® 326 from Ciba or with the name Uvinul® 3026 from BASF AG; 2,2'-methylenebis[6-(2H-benzotriazol-2-yl)-4-(1,1,3,3-tetramethylbutyl)phenol (CAS No. 103597-45-1), which is commercially available with the name Tinuvin® 360 from Ciba or the name ADK Stab LA31® from Adeka-Palmarole; ethyl-2-cyano-3,3-diphenyl acrylate (CAS No. 5232-99-5), which is commercially available with the name Uvinul® 3035 from BASF AG; 2-ethylhexyl-2-cyano-3,3-diphenyl acrylate (CAS No. 6197-30-4), which is commercially available with the name Uvinul® 3039 from BASF AG; 1,3-bis [(2'-cyano-3',3'-diphenylacryloyl)oxy]-2,2-bis{[(2'-cyano-3',3'-diphenylacryloyl)oxy]methyl}propane (CAS No. 178671-58-4), which is commercially available with the name Uvinul® 3030 from BASF AG; tetraethyl-2,2'-(1,4-phenylenedimethylidene) bismalonate (CAS No. 6337-43-5), which is commercially available with the name Hostavin® B-CAP™ XP3030 from Clariant GmbH.

The proportion by weight of the UV absorber in the covering layer is 0.50 wt. %-11.00 wt. %, preferably 1.00 wt. %-3.00 wt. % and in a special embodiment 4.00 wt. %-8.00 wt. %, based on the overall composition of the covering layer. The polycarbonate can be linear or branched, and it can also contain mixtures of the above-mentioned UV absorbers, in which case the statement of weight of the UV absorbers corresponds to the sum of the two UV absorbers. Where a UV absorber is used in the base layer, the proportion by weight is 0.01 wt. %-1.00 wt. %, preferably 0.05 wt. %-0.50 wt. %, based on the overall composition of the base layer.

The products according to the invention, in particular solid sheets or multi-wall sheets, can also contain other functional or decorative layers, for example produced by coextrusion or coating methods. Applications for the products are found in the sectors of architectural glazing, in particular roofing and glazing for swimming pools, car ports, greenhouses, industrial complexes and private buildings, as well as noise protection walls and screen walls.

Examples of Embodiments

Raw Materials and Additives Used

Makrolon® DP1-1883 is commercially available from Bayer MaterialScience AG. It is a linear polycarbonate based on bisphenol A with a melt volume flow rate (MVR) determined in accordance with ISO 1133 of 6.0 $cm^3/(10$ min) at 300° C. and 1.2 kg load.

Makrolon® 1243 MAS 157 is commercially available from Bayer MaterialScience AG. Makrolon® 1243 MAS 157 is a branched polycarbonate based on bisphenol A with a melt volume flow rate (MVR) in accordance with ISO 1133 of 6.0 $cm^3/(10$ min) at 300° C. and 1.2 kg load.

"Scattering additive compound": this compound is a polycarbonate masterbatch based on linear polycarbonate (with a melt volume flow rate (MVR) determined in accordance with ISO 1133 of 6.0 $cm^3/(10$ min) at 300° C. and 1.2 kg load) containing a scattering additive comprising core-shell particles based on polymethyl methacrylate and polybutyl acrylate with a particle size of 2 to 15 µm and an average particle size of 8 µm (Paraloid® EXL 5137 from Rohm & Haas) with a proportion of approx. 20.00 wt. %, based on the total weight of the "scattering additive compound".

Makrolon® DP1-1816 MAS 073 is a linear polycarbonate based on bisphenol A containing triazine-based UV absorbers from Bayer MaterialScience AG with a melt volume flow rate (MVR) in accordance with ISO 1133 of 9.0 $cm^3/(10$ min) at 300° C. and 1.2 kg load.

Reofos® BAPP is bisphenol A diphosphate (BDP) obtainable from Chemtura (Indianapolis, USA).

Pocan® 1300 is an aromatic polyester based on polybutylene terephthalate and is obtainable from Lanxess AG.

Production of the Polycarbonate Composition for the Base Layers in the Following Examples:

The polycarbonate compositions were produced by compounding. The apparatus for compounding consists of:
  metering apparatus for the components a co-rotating twin-screw extruder (ZSK 53 from Werner & Pfleiderer) with a screw diameter of 53 mm
a perforated die for forming melt strands
a water bath for cooling and solidifying the strands
a pelletiser.

The procedure for the production of the compounds was that a mixture of Makrolon® 1243 MAS 157 and the other fillers listed below was metered into the quantities of Makrolon® DP1-1883 given below, so that the mixtures (compounds) mentioned in the examples resulted.

Material for the base layer of Example 1 (comparison):
77.5% Makrolon® DP1-1883
17.5% Makrolon® 1243 MAS 157
5% scattering additive compound Material for the base layer of Example 2 (comparison):
76.5% Makrolon® DP1-1883
16.5% Makrolon® 1243 MAS 157
5% scattering additive compound
2% Pocan® Pocari 1300

Material for the base layer of Example 3 (comparison):
75% Makrolon® DP1-1883
15% Makrolon® 1243 MAS 157
5% scattering additive compound
5% Reofos® BAPP Material for the base layer of Example 4 (according to the invention):
74% Makrolon® DP1-1883
14% Makrolon® 1243 MAS 157
2% Pocan® 1300
5% scattering additive compound
5% Reofos® BAPP These compositions were each used as material for the base layer for the extrusion of the multi-wall sheets. The housing temperatures of the above-mentioned compounding extruder used for the production of the base materials were: in zone 1 60-80° C., in zone 2 140-160° C. and in each of the subsequent zones between 280 and 305° C. The throughput was approx. 75 kg/h. The melt temperature was between 340° C. and 350° C. The Reofos® BAPP was metered in molten form.

Production of the Polycarbonate Five-wall Sheets:

Polycarbonate five-wall sheets were produced with the aid of the following machines and apparatus:
a single screw extruder (degassing extruder, screw diameter 70 mm and a single screw with a length of 33 D, single screw, Reifenhäuser, Troisdorf/Germany)
The extruder is equipped with vacuum melt degassing.
a 2-layer coextrusion adapter (fixed adapter from Bexsol, Italy)
a 3-zone coextruder (screw diameter 30 mm, single screw with a length of 25 D, Omipa, Italy)
a multi-wall sheet die with a width of 500 mm for multi-wall sheet thicknesses of 8 to 45 mm from Bexsol, Italy
a two-part vacuum calibrator, width 500 mm, length 2×950 mm, Breyer, Singen/Germany
a roller conveyor, roller conveyor length (calibrator/cutter distance) 3.5 m
a take-off device
a transverse cutter (knife)
a stacking table.

As covering layer (on one side) in all of the examples 1-4, a material was used which contains linear polycarbonate and a triazine-based UV absorber. This material is available from Bayer MaterialScience AG with the trade name Makrolon® DP1-1816 MAS 073. The covering layer is obtained by coextrusion. The thickness of the coex layer is 50 µm.

The multi-wall sheets provided on one side with a coextrusion layer (Examples 1-4) were produced as follows: the polycarbonate pellets of the base material were fed into the feed hopper of the main extruder in each case and melted and conveyed by means of the barrel/screw. The temperatures of the individual housings of the main extruder were 240° to 260° C. and the resulting melt temperature was 240-255° C. The screw speed was between 50 and 56 rpm. As material for the coextrusion layer on one side, Makrolon® DP1-1816 MAS 073 was used, which was fed into the feed hopper of the coextruder. The housing temperatures of the coextruder were 265° C., and the melt temperature was approx. 252° C. The screw speed was 10 rpm.

The two material melts were brought together in the coex adapter and then shaped in a special extrusion die, which was a multi-wall sheet die for the production of a hollow chamber profile consisting of an upper wall, a lower wall and 3 middle walls. The profile additionally has ribs with an X profile. The take-off speed was 0.7 m/s. The remainder of the devices in the equipment were used for the transport, cutting and stacking of the sheets.

The sheets extruded using this die had a thickness of approx. 40 mm and a sheet width of 510 mm and had a weight per unit area of 4.4 kg/m². The covering layer (from the coextrusion) contains Makrolon® DP1-1816 MAS 073 in a thickness of 50 µm Ideally, the resulting multi-wall sheet should have the profile as described in FIG. 1.

Figure 3:
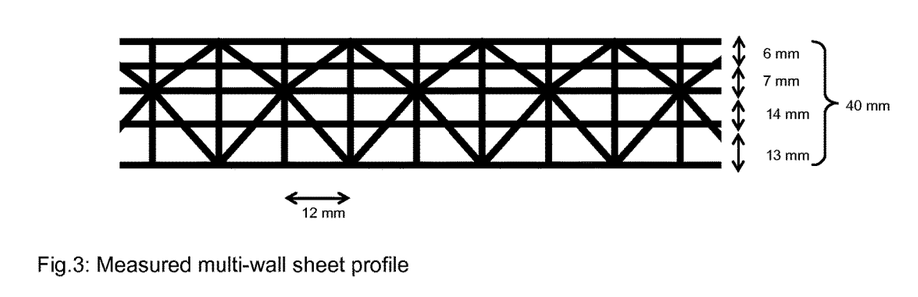
FIG. 3 illustrates an example of a Measured multi-wall sheet profile.

The multi-wall sheets produced are five-wall sheets with deviations from the ideal geometry, but which are essential for the flame retardant behaviour. Above all, the sheet thickness and the weight per unit area are decisive parameters for the flame behaviour. For the sake of completeness, the resulting multi-wall sheet profile was measured again. The result is shown in FIG. 3. The coextrusion layer is not depicted in the figure; it is located on the upper wall in a thickness of 50 µm.

Flame Retardancy Tests:

The fire shaft test according to DIN 4102 provides for the following conditions: 4 samples measuring 19 cm×100 cm×original thickness are arranged vertically and at right angles to one another.

After 10 minutes' exposure to flames from a ring burner, the burner is switched off The fire shaft test is considered to have been passed if—the average value of the residual lengths that have not been destroyed is at least 150 mm and none of the samples has burned away completely (residual length 0 mm),—the average flue gas temperature does not exceed 200° C.

Before the test, the mouldings were stored in a standard conditioning atmosphere until they reached constant weight. The pellets of polycarbonate and polyester are mixed and can be either processed into sheets directly on an extruder or after upstream homogenising on an extruder and subsequent pelletising.

All of the fire tests were performed in the certified fire testing facility of Currenta GmbH & Co. OHG, Leverkusen according to DIN 4102.

As a flame retardancy test, the fire shaft test described above was performed on the sheets of Examples 1-4. The results are listed in the table shown below.

As a further flame retardancy test, a dripping test according to NF P 92-505 was performed. This test is part of the testing programme under French building materials regulations. This testing programme is divided into the epiradiateur test, the electrical burner test and the dripping test. Different test are relevant depending on the material. With regard to the performance of the thermoplastic material, the dripping test is of particular importance here. In this test, the specimen is arranged horizontally on a grid at a distance of 30 mm from the radiator. During the test period of 10 minutes, the ignition and dripping behaviour is observed. If the specimen ignites during the first 5 minutes of the test, the radiator is moved aside until the flames are extinguished. For the following 5 minutes, the thermal load is not interrupted irrespective of ignition. "Burning drips" are present if, in at least one of 4 tests, the cellulose wool placed 300 mm below the specimen is ignited. Burning drips lead to a classification of "failed".

TABLE 1

| Multi-wall sheet from Example | DIN 4102-B1 | Fire shaft Max. average flue gas temperature [° C.] | Max. absorption integral [% * min] | Dripping test NF P 92-505 |
|---|---|---|---|---|
| 1 | Failed | >300 | — | Failed |
| 2 | Failed | >300 | — | Failed |
| 3 | Passed | 120.7 | 82.3 | Failed |
| 4 | Passed | 118.6 | 56.2 | Passed |

It can clearly be seen that the sheet made of the composition according to the invention (Example 4) passes the relevant flame retardancy tests whereas the comparison sheets made of compositions with other formulations according to the prior art fail the corresponding flame retardancy tests.

The invention claimed is:

1. A sheet comprising a composition comprising an aromatic polycarbonate and
   a) 0.1 wt. % to 4 wt. % of an acrylate-based scattering additive,
   b) 0.5 wt. % to 5 wt. % of an aromatic-aliphatic polyester, and
   c) 0.5 wt. % to 8 wt. % of a phosphorus-based flame retardant,
   wherein the sheet passes both the fire shaft test according to DIN 4102 B1 and the dripping test according to NF P 92-505;
   wherein the aromatic polycarbonate is a mixture which comprises at least 70 wt. % linear polycarbonate and at least 10 wt. % branched polycarbonate;
   wherein the sheet has a weight per unit area of greater than or equal to 2.4 kg/m².

2. The sheet according to claim 1, wherein the aromatic polyester comprises a polybutylene terephthalate.

3. The sheet according to claim 1, wherein the aromatic polyester comprises a polyester of which the acid component comprises at least 85 mole % terephthalic acid and the diol component comprises at least 80 mole % of one or more diols selected from the group consisting of 1,4-butanediol, 1,2-ethanediol, 1,4-cyclohexanedimethanol, and combinations thereof.

4. The sheet according claim 1, wherein the scattering additive is selected from the group consisting of acrylate scattering additives, containing core-shell polymers based on polymethyl acrylate and polybutyl acrylate, partially crosslinked spherical acrylate particles, fully crosslinked spherical acrylate particles, partially crosslinked non-spherical acrylate particles and fully crosslinked non-spherical acrylate particles.

5. The sheet according to claim 1, wherein the phosphorus-based flame retardant is selected from the group consisting of one or more compounds of the formula (4)

wherein
R₁, R₂, R₃ and R₄, independently of one another, represent optionally halogen-substituted C₁-C₈ alkyl or, each optionally halogen- and/or alkyl-substituted, C₅-C₆ cycloalkyl, C₆-C₁₀ aryl or C₇-C₁₂ aralkyl,
n independently of one another represents 0 or 1,
q independently of one another represents 0, 1, 2, 3 or 4, and
N is 0.6 to 4,
R₅ and R₆, independently of one another, represent a C₁-C₄ alkyl, and
Y represents a C₁-C₇ alkylidene, a C₁-C₇ alkylene, a C₅-C₁₂ cycloalkylene, a C₅-C₁₂ cycloalkylidene, —O—, —S—, —SO—, —SO₂—, —CO— or a residue of formula (5) or (6)

wherein
Z represents carbon and
R²¹ and R²² can be selected for each Z individually and, independently of one another,
represent hydrogen or a C1-C6 alkyl,
m is an integer from 4 to 7,
with the proviso that, on at least one Z atom, R²¹ and R²² are simultaneously alkyl.

6. The composition according to claim 5, wherein R5 and R6, independently of one another, represent methyl or a halogen.

7. The composition according to claim 5, wherein R5 and R6, independently of one another, represent chlorine and/or bromine.

8. The sheet according to claim 5, wherein R21 and R22 can be selected for each Z individually and, independently of one another, represent hydrogen, methyl or ethyl.

9. The sheet according to claim 5, wherein m is an integer from 4 to 5.

10. The sheet according to claim 5, wherein the phosphate-containing flame retardant comprises bisphenol A diphosphate.

11. The sheet according to claim 1, wherein the sheet is a solid or multi-wall sheet.

12. The sheet according to claim 11, wherein the sheet exhibits less burning drips and reduced maximum flue gas temperature in the event of fire compared with sheets that are not treated with the composition.

13. The sheet according to claim 1, wherein the sheet is a multi-layer sheet comprising a base layer comprising the composition.

14. The sheet according to claim 13, wherein the multi-layer sheet further comprises a coextruded covering layer on one side or a coextruded covering layer on both sides comprising UV absorbers.

15. The sheet according to claim 14, wherein the UV absorber in the covering layer or covering layers is selected from one or more compounds from the group consisting of triazines, benzotriazoles, cyanoacrylates and bismalonates and the base layer contains no UV absorber or one or more UV absorbers selected from the group consisting of benzotriazoles, cyanoacrylates and bismalonates.

16. A process comprising coextruding the multi-layer sheet according to claim 14.

17. The sheet according to claim 1, wherein the scattering additive is a core-shell polymer with an average particle diameter of 2 to 15 µm.

18. The sheet according to claim 17, wherein the core-shell polymer is based on polymethyl acrylate and polybutyl acrylate.

19. A sheet comprising
a base layer consisting of a composition consisting of an aromatic polycarbonate selected from the group consisting of linear aromatic polycarbonates, branched aromatic polycarbonates, and mixtures thereof, and
a) 0.1 wt. % to 4 wt. % of an acrylate-based scattering additive,
b) 0.5 wt. % to 5 wt. % of an aromatic-aliphatic polyester,
c) 0.5 wt. % to 8 wt. % of a phosphorus-based flame retardant, and
d) optionally additives selected from the group consisting of
fillers;
UV stabilisers;
heat stabilisers;
antistatic agents;
external mold release agents or free-flow agents selected from the group consisting of low-molecular weight carboxylic acid esters, chalk, silica flour, glass and carbon fibers, and mixtures thereof;
salts to further increase flame resistance selected from the group consisting of alkali or alkaline earth salts of aliphatic or aromatic sulfonic acid, sulfonamide or sulfonimide derivatives, sodium or potassium pentachlorobenzoate, sodium or potassium 2,4,6-trichlorobenzoate, sodium or potassium 2,4-dichlorozenzoate, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, and combinations thereof;
halogen-containing flame retardants;
polytetrafluoroethylene;
UV absorbers selected from the group consisting of benzotriazoles, triazines, cyanoacrylates, bismalonates, and mixtures thereof; and
mixtures thereof; and
(e) optionally plastics selected from the group consisting of polyamides, polyimides, polyester amides, polyacrylates, polymethacrylates, polyacetals, polyurethanes, polyolefins, halogen-containing polymers, polysulfones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or alpha-methylstyrene with dienes or acrylic derivatives, graft polymers based on acrylonitrile/butadiene/styrene, graft copolymers based on acrylate rubber or silicone rubbers, and mixtures thereof;
wherein the sheet passes both the fire shaft test according to DIN 4102 B1 and the dripping test according to NF P 92-505;
wherein the sheet has a weight per unit area of greater than or equal to 2.4 kg/m$^2$.

* * * * *